(12) United States Patent  
Kim et al.

(10) Patent No.: US 10,547,081 B2  
(45) Date of Patent: Jan. 28, 2020

(54) ELECTROLYTIC COPPER FOIL CAPABLE OF IMPROVING CAPACITY RETENTION RATE OF SECONDARY BATTERY, ELECTRODE INCLUDING THE SAME, SECONDARY BATTERY INCLUDING THE SAME, AND METHOD OF MANUFACTURING THE SAME

(71) Applicant: LS Mtron Ltd., Anyang-si, Gyeonggi-do (KR)

(72) Inventors: Seung Min Kim, Anyang-si (KR); Shan Hua Jin, Anyang-si (KR)

(73) Assignee: KCF TECHNOLOGIES CO., LTD., Anyang-si, Gyeonggi-Do (KR)

( * ) Notice: Subject to any disclaimer, the term of this patent is extended or adjusted under 35 U.S.C. 154(b) by 214 days.

(21) Appl. No.: 15/662,785

(22) Filed: Jul. 28, 2017

(65) Prior Publication Data

US 2018/0062199 A1 Mar. 1, 2018

(30) Foreign Application Priority Data

Aug. 23, 2016 (KR) .................. 10-2016-0106695

(51) Int. Cl.
*H01M 10/0562* (2010.01)
*H01M 4/04* (2006.01)
(Continued)

(52) U.S. Cl.
CPC .......... *H01M 10/0562* (2013.01); *C25D 1/00* (2013.01); *C25D 1/04* (2013.01); *C25D 1/20* (2013.01);
(Continued)

(58) Field of Classification Search
None
See application file for complete search history.

(56) References Cited

U.S. PATENT DOCUMENTS

2002/0153254 A1* 10/2002 Belongia ............... C25D 21/18
205/101
2011/0056840 A1* 3/2011 Isono .................... C25D 21/04
205/296
(Continued)

FOREIGN PATENT DOCUMENTS

CN 102376959 A 3/2012
JP 2000182623 * 6/2000
(Continued)

OTHER PUBLICATIONS

Japanese Office Action for related Japanese Application No. 2017-149163; dated Oct. 23, 2018; (2 pages).
(Continued)

*Primary Examiner* — Alix E Eggerding
(74) *Attorney, Agent, or Firm* — K&L Gates LLP (57) ABSTRACT

An electrolytic copper foil capable of improving a capacity retention rate of a secondary battery, an electrode including the same, a secondary battery including the same, and a method of manufacturing the same. The electrolytic copper foil, which includes a first surface and a second surface opposite the first surface, includes a copper layer including a matte surface facing the first surface and a shiny surface facing the second surface, and a first protective layer on the matte surface of the copper layer, wherein the first surface has a peak density (PD) of 3 to 110, a texture coefficient [TC(220)] of a (220) plane of 1.32 or less, and a surface roughness (Rz) of 0.5 to 2.7 μm.

20 Claims, 3 Drawing Sheets

(51) Int. Cl.
*H01M 4/38* (2006.01)
*C25D 1/20* (2006.01)
*C25D 1/00* (2006.01)
*C25D 1/04* (2006.01)
*C25D 3/38* (2006.01)
*C25D 7/06* (2006.01)
*H01M 10/0525* (2010.01)

(52) U.S. Cl.
CPC ............ *C25D 3/38* (2013.01); *C25D 7/0614* (2013.01); *C25D 7/0692* (2013.01); *H01M 4/0407* (2013.01); *H01M 4/0438* (2013.01); *H01M 4/386* (2013.01); *H01M 10/0525* (2013.01)

(56) References Cited

U.S. PATENT DOCUMENTS

| | | | |
|---|---|---|---|
| 2013/0108887 A1 | 5/2013 | Kim et al. | |
| 2014/0017564 A1 | 1/2014 | Suzuki et al. | |
| 2014/0170489 A1 | 6/2014 | Matsushima et al. | |
| 2014/0342178 A1* | 11/2014 | Saito | C25D 1/04 428/606 |
| 2015/0030873 A1 | 1/2015 | Cheng et al. | |
| 2016/0013493 A1* | 1/2016 | Shinozaki | C25D 1/04 205/50 |
| 2019/0078229 A1* | 3/2019 | Muglali | G01N 27/42 |

FOREIGN PATENT DOCUMENTS

| | | |
|---|---|---|
| JP | 2000182623 A | 6/2000 |
| JP | 2001329390 A | 11/2001 |
| JP | 2007213812 A | 8/2007 |
| JP | 2011058034 A | 3/2011 |
| JP | 2012022939 A | 2/2012 |
| JP | 2012151106 A | 8/2012 |
| JP | 2015021186 A | 2/2015 |
| JP | 2015025177 A | 2/2015 |
| JP | 2015183294 A | 10/2015 |
| JP | 5918333 B2 | 5/2016 |
| KR | 10-2010-0125044 A | 11/2010 |
| TW | 201512466 A | 4/2015 |
| WO | 2013018898 A1 | 2/2013 |
| WO | 2014-002996 A1 | 1/2014 |

OTHER PUBLICATIONS

Taiwan Notice of Allowance from related Taiwanese Application No. 106128106; dated Jan. 19, 2018; (4 pages).

European search report dated Nov. 9, 2017 for European Patent Application No. 17187500.8 corresponding to the above-referenced U.S. application.

Japanese Office Action for related Japanese Application No. 2017-149163; dated Jul. 2, 2019; (3 pages).

* cited by examiner

ELECTROLYTIC COPPER FOIL CAPABLE OF IMPROVING CAPACITY RETENTION RATE OF SECONDARY BATTERY, ELECTRODE INCLUDING THE SAME, SECONDARY BATTERY INCLUDING THE SAME, AND METHOD OF MANUFACTURING THE SAME

CROSS-REFERENCE TO RELATED APPLICATION

This application claims priority to and the benefit of Korean Patent Application No. 2016-0106695, filed on Aug. 23, 2016, the disclosure of which is incorporated herein by reference in its entirety.

BACKGROUND

1. Field of the Invention

The present invention relates to an electrolytic copper foil capable of improving a capacity retention rate of a secondary battery, an electrode including the same, a secondary battery including the same, and a method of manufacturing the same.

2. Discussion of Related Art

A secondary battery is a type of energy conversion device that converts electrical energy into chemical energy, stores the chemical energy, and generates electricity by converting the chemical energy into electrical energy when the electricity is needed, and is referred to as a "rechargeable battery."

Lead-acid batteries, nickel cadmium secondary batteries, nickel hydrogen secondary batteries, lithium secondary batteries, and the like are secondary batteries which are economically and environmentally advantageous compared to disposable primary batteries.

Lithium secondary batteries may store a relatively large amount of energy relative to a size and weight thereof in comparison to other secondary batteries. Therefore, in the field of information communication devices in which portability and mobility are important, the lithium secondary batteries are preferred and an application range thereof is also expanding to energy storage devices for hybrid vehicles and electric vehicles.

Lithium secondary batteries are used by repeatedly performing a cycle including charging and discharging. When operating a certain device with a fully charged lithium secondary battery, the lithium secondary battery should have a high charge and discharge capacity to increase an operating time of the device. Therefore, research to satisfy the ever-increasing expectations (needs) of consumers for charge and discharge capacity of a lithium secondary battery is continuously required.

Meanwhile, even though a secondary battery has a sufficiently high charge and discharge capacity, when the charge and discharge capacity of the secondary battery is rapidly reduced due to the repetition of the charge and discharge cycle (i.e., when a capacity retention rate of the secondary battery is low or a lifetime thereof is short), consumers will need to frequently replace the secondary battery, which will result in consumer inconvenience and waste of resources.

SUMMARY OF THE INVENTION

The present invention is directed to an electrolytic copper foil capable of preventing problems caused by limitations and disadvantages of the related art, an electrode including the same, a secondary battery including the same, and a method of manufacturing the same.

The present invention is directed to an electrolytic copper foil capable of securing a secondary battery having a high capacity retention rate.

The present invention is directed to an electrode capable of securing a secondary battery having a high capacity retention rate.

The present invention is directed to a secondary battery having a high capacity retention rate.

The present invention is directed to a method of manufacturing an electrolytic copper foil capable of securing a secondary battery having a high capacity retention rate.

In addition to the above-described aspects of the present invention, other features and advantages of the present invention will be described below or will become apparent to those skilled in the art from the following description.

According to an aspect of the present invention, there is provided an electrolytic copper foil having a first surface and a second surface opposite the first surface, the electrolytic copper foil including a copper layer having a matte surface facing the first surface and a shiny surface facing the second surface, and a first protective layer on the matte surface of the copper layer, wherein the first surface has a peak density (PD) of 3 to 110, a texture coefficient [TC(220)] of a (220) plane of 1.32 or less, and a surface roughness (Rz) of 0.5 to 2.7 μm.

The electrolytic copper foil may further include a second protective layer on the shiny surface of the copper layer, wherein the second surface may have a PD of 3 to 110, a texture coefficient [TC(220)] of a (220) plane of 1.32 or less, and a surface roughness ($R_z$) of 0.5 to 2.7 μm.

A difference between the PDs of the first and second surfaces may be 95 or less, a difference between the texture coefficients [TC(220)] of the (220) planes of the first and second surfaces may be 0.53 or less, and a difference between the surface roughnesses (Rz) of the first and second surfaces may be 0.8 μm or less.

Each of the first and second protective layers may include chromium (Cr).

The electrolytic copper foil may have a yield strength of 21 to 63 kgf/mm$^2$ and an elongation of 3% or more at room temperature.

According to another aspect of the present invention, there is provided a secondary battery electrode, the secondary battery electrode including an electrolytic copper foil having a first surface and a second surface opposite the first surface, and a first active material layer on the first surface of the electrolytic copper foil, wherein the electrolytic copper foil includes a copper layer including a matte surface facing the first surface and a shiny surface facing the second surface, and a first protective layer on the matte surface of the copper layer, wherein the first surface has a PD of 3 to 110, a texture coefficient [TC(220)] of a (220) plane of 1.32 or less, and a surface roughness (Rz) of 0.5 to 2.7 μm.

The electrolytic copper foil may further include a second protective layer on the shiny surface of the copper layer, the secondary battery electrode may further include a second active material layer on the second protective layer, and the second surface may has a PD of 3 to 110, a texture coefficient [TC(220)] of a (220) plane of 1.32 or less, and a surface roughness (Rz) of 0.5 to 2.7 μm.

A difference between the PDs of the first and second surfaces may be 95 or less, a difference between the texture coefficients [TC(220)] of the (220) planes of the first and second surfaces may be 0.53 or less, and a difference between the surface roughnesses (Rz) of the first and second surfaces may be 0.8 μm or less.

Each of the first and second active material layers may include at least one active material selected from a group consisting of carbon, a metal such as Si, Ge, Sn, Li, Zn, Mg, Cd, Ce, Ni, or Fe, an alloy containing the metal, an oxide of the metal, and a composite of the metal and carbon.

Each of the first and second active material layers may include Si.

According to still another aspect of the present invention, there is provided a secondary battery, the secondary battery including a cathode, an anode opposite to the cathode and including the secondary battery electrode, an electrolyte configured to provide an environment in which lithium ions may move between the cathode and the anode, and a separator configured to electrically insulate the cathode from the anode.

According to yet another aspect of the present invention, there is provided a method of manufacturing a secondary battery electrolytic copper foil, the method including forming a copper layer by applying electricity between a positive electrode plate and a rotating negative electrode drum which are disposed in an electrolytic solution containing 70 to 90 g/L of copper ions and 50 to 150 g/L of sulfuric acid to be spaced apart from each other, and forming a protective layer on the copper layer, wherein the forming of the copper layer includes performing a heat treatment on a copper wire, pickling the heat-treated copper wire, preparing the electrolytic solution by introducing the pickled copper wire into sulfuric acid, performing electroplating by applying electricity between the positive electrode plate and the rotating negative electrode drum at a current density of 40 to 80 A/dm$^2$, and performing continuous filtration at a flow rate of 31 to 45 m$^3$/hr to remove solid impurities from the electrolytic solution while the electroplating is performed, wherein, while the electroplating is performed, total carbon (TC) in the electrolytic solution is maintained at 0.25 g/L or less, a concentration of silver (Ag) therein is maintained at 0.2 g/L or less, and a concentration of iron (Fe) therein is maintained to be 0.54 g/L or less.

The method may further include monitoring the concentration of iron (Fe) in the electrolytic solution while the electroplating is performed, and replacing all or some of the electrolytic solution when the concentration of iron (Fe) is more than 0.54 g/L.

The copper wire may be heat-treated at a temperature of 600 to 900° C. for 30 to 60 minutes.

The electrolytic solution may further include chloride ion capable of precipitating silver (Ag) in the form of AgCl in order to prevent the concentration of silver (Ag) from exceeding 0.2 g/L by silver (Ag) being introduced into the electrolytic solution while the electroplating is performed.

The forming of the copper layer may further include introducing hydrogen peroxide and air into the electrolytic solution while the electroplating is performed.

The electrolytic solution may further include an organic additive selected from a group consisting of hydroxyethyl cellulose (HEC), organic sulfides, organic nitrides, and thiourea-based compounds.

The electrolytic solution may further include 1 to 10 ppm of ethylene thiourea.

The electrolytic solution may contain 15 to 25 ppm of chloride ion (Cl$^-$).

The forming of the copper layer may include polishing a surface of the rotating negative electrode drum with an abrasive brush having #800 to #1500 of a particle-size (Grit).

The forming of the protective layer may include immersing the copper layer in an antirust solution containing 0.5 to 1.5 g/L of Cr, and a concentration of copper (Cu) in the antirust solution may be maintained at 0.1 g/L or less.

The general description of the present invention as described above is merely intended to illustrate or explain the present invention and does not limit the scope of the present invention.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present invention will be described in detail with reference to the accompanying drawings.

It should be apparent to those skilled in the art that various modifications and alterations can be made in the present invention without departing from the spirit and scope of the invention. Therefore, the present invention includes all modifications and alterations that come within the scope of the invention as defined in the appended claims and equivalents thereof.

A lithium secondary battery includes a cathode, an anode, an electrolyte, which provides an environment in which lithium ions may move between the cathode and the anode, and a separator, which electrically insulates the cathode from the anode to prevent electrons generated at one electrode from being inefficiently consumed by moving the electrons to the other electrode through an inside of the secondary battery.

Figure 1:
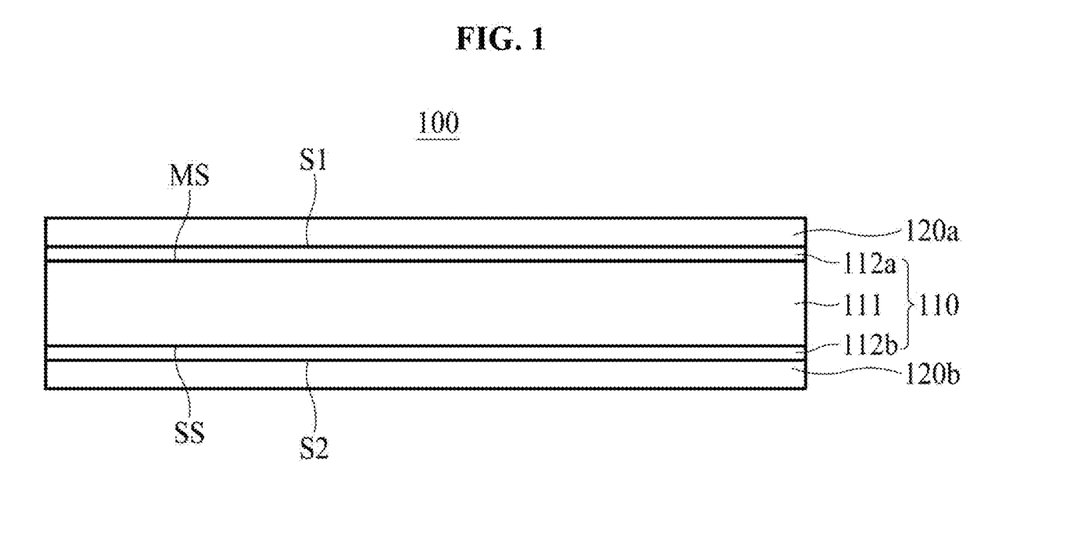
FIG. 1 is a cross-sectional view of a secondary battery electrode according to an embodiment of the present invention.

FIG. 1 is a cross-sectional view of a secondary battery electrode according to an embodiment of the present invention.

As illustrated in FIG. 1, a secondary battery electrode 100 according to an embodiment of the present invention includes an electrolytic copper foil 110 having a first surface S1 and a second surface S2 opposite the first surface S1, a first active material layer 120a on the first surface S1, and a second active material layer 120b on the second surface S2. In FIG. 1, an example in which the active material layers 120a and 120b are illustrated as being formed on both the first and second surfaces S1 and S2 of the electrolytic copper foil 110, respectively, but the present invention is not limited thereto, and the secondary battery electrode 100 of the present invention may include only one of the first and second active material layers 120a and 120b as an active material layer.

Generally, in a lithium secondary battery, an aluminum foil is used as a positive electrode current collector coupled to a positive electrode active material, and an electrolytic copper foil is used as a negative electrode current collector coupled to a negative electrode active material.

According to an embodiment of the present invention, the secondary battery electrode 100 is used as an anode of a lithium secondary battery, the electrolytic copper foil 110 functions as a negative electrode current collector, and each of the first and second active material layers 120a and 120b includes a negative electrode active material.

As illustrated in FIG. 1, the electrolytic copper foil 110 of the present invention, which functions as a negative electrode current collector of a secondary battery, includes a copper layer 111 having a matte surface MS and a shiny surface SS, a first protective layer 112a on the matte surface MS of the copper layer 111, and a second protective layer 112b on the shiny surface SS of the copper layer 111.

The matte surface MS is a surface of the copper layer 111 facing the first surface S1 of the electrolytic copper foil 110, and the shiny surface SS is a surface of the copper layer 111 facing the second surface S2 of the electrolytic copper foil 110.

The copper layer 111 of the present invention may be formed on a rotating negative electrode drum by electroplating being performed. The shiny surface SS thereof refers to a surface that comes into contact with the rotating negative electrode drum in an electroplating process, and the matte surface MS refers to a surface opposite the shiny surface SS.

Generally, the shiny surface SS has a lower surface roughness (Rz) than the matte surface MS, but the present invention is not limited thereto, and the surface roughness (Rz) of the shiny surface SS may be higher than or equal to that of the matte surface MS.

The first and second protective layers 112a and 112b may be formed to prevent corrosion of the copper layer 111 and improve heat resistance thereof, and may include chromium (Cr).

In FIG. 1, an example in which the protective layers 112a and 112b are formed on both the matte surface MS and the shiny surface SS of the copper layer 111 is illustrated, but the present invention is not limited thereto, and the electrolytic copper foil 110 of the present invention may include only one of the first and second protective layers 112a and 112b as a protective layer.

The secondary battery electrolytic copper foil 110 of the present invention may have a yield strength of 21 to 63 kgf/mm$^2$ at room temperature (25±15° C.). The yield strength is measured using a universal testing machine (UTM), wherein a width of a sample is 12.7 mm, a distance between grips is 50 mm, and a measurement speed is 50 mm/min.

When the yield strength of the electrolytic copper foil 110 is less than 21 kgf/mm$^2$, there is a risk of wrinkling due to a force applied in a process of manufacturing the electrode 100 and the secondary battery. On the other hand, when the yield strength of the electrolytic copper foil 110 is more than 63 kgf/mm$^2$, workability of the process of manufacturing the secondary battery is degraded.

The secondary battery electrolytic copper foil 110 of the present invention may have an elongation of 3% or more at room temperature (25±15° C.). When the elongation of the electrolytic copper foil 110 is less than 3%, the electrolytic copper foil 110 may not be stretched responding to the force applied in the process of manufacturing the electrode 100 and the secondary battery, and a risk of tearing the electrolytic copper foil 110 is increased.

The electrolytic copper foil 110 of the present invention may have a thickness of 3 to 20 μm.

Each of the first and second active material layers 120a and 120b includes at least one active material selected from the group consisting of carbon, a metal such as Si, Ge, Sn, Li, Zn, Mg, Cd, Ce, Ni, or Fe, an alloy containing the metal, an oxide of the metal, and a composite of the metal and carbon as a negative electrode active material.

In order to increase charge and discharge capacity of the secondary battery, the active material layers 120a and 120b may be formed of a mixture containing a predetermined amount of Si.

Meanwhile, as charging and discharging of the secondary battery is repeated, contraction and expansion of the active material layers 120a and 120b occur alternately. This causes separation of the active material layers 120a and 120b from the electrolytic copper foil 110, thereby reducing a charge and discharge efficiency of the secondary battery. Therefore, in order for the secondary battery to have a capacity retention rate and a lifetime of a certain level or more (i.e., in order to suppress deterioration of the charge and discharge efficiency of the secondary battery), the electrolytic copper foil 110 should have an excellent coating property with respect to the active material so that an adhesion strength between the electrolytic copper foil 110 and the active material layers 120a and 120b should be high.

Generally, it is known that the adhesion strength between the electrolytic copper foil 110 and the active material layers 120a and 120b may be improved by controlling the surface roughness (Rz) of the electrolytic copper foil 110. However, actually, the electrolytic copper foil 110 whose surface roughness (Rz) is appropriately adjusted (e.g., adjusted to 2 μm or less) does not necessarily satisfy an adhesion force between the electrolytic copper foil 110 and the active material layers 120a and 120b required in a specification. Therefore, a capacity retention rate of 80% or more of the secondary battery (after charging and discharging 500 times), which is required in the industry, may not be secured.

Specifically, it is known that, when the active material layers 120a and 120b include Si to increase the capacity of the secondary battery, a relationship between the surface roughness (Rz) of the electrolytic copper foil 110 and the capacity retention rate of the secondary battery is low.

According to the present invention, it is discovered by the inventors that, when securing an adhesive force between the electrolytic copper foil 110 and the active material layers 120a and 120b which is large enough to ensure a capacity retention rate of 80% or more of the secondary battery, a peak density (PD) and a texture coefficient of a (220) plane are important factors in addition to the surface roughness (Rz) of the surface of the electrolytic copper foil 110.

Figure 2:
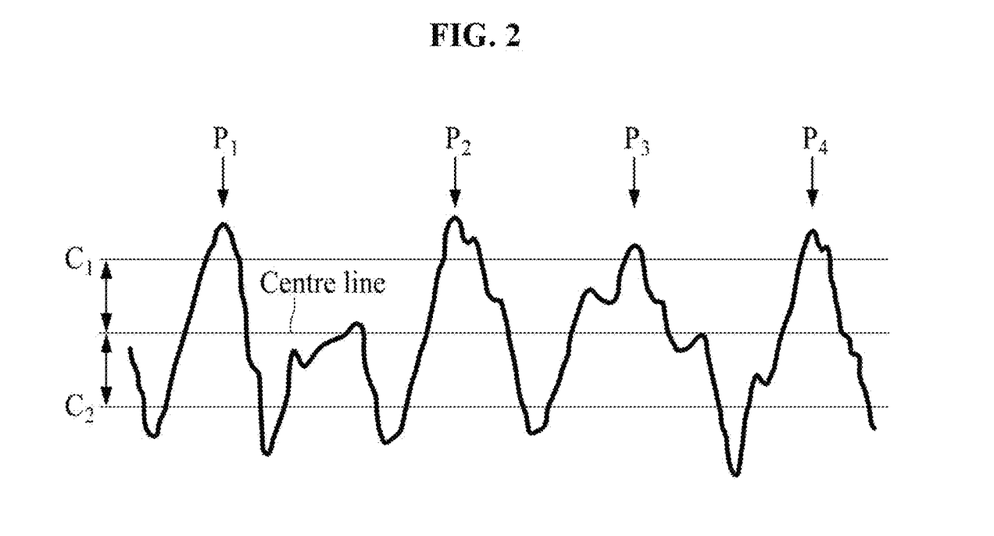
FIG. 2 illustrates a surface roughness profile obtained according to U.S. standard ASME B46.1-2009.

Hereinafter, the PD which is one important factor will be described in detail with reference to FIG. 2.

In the present invention, the "PD" may be obtained by measuring PDs of any three points on the surface of the electrolytic copper foil 110 and calculating an average value of measured values of the PDs. The PD of each of the points is the number of effective peaks P1, P2, P3, and P4 which rise above a 0.5 μm upper criteria line C1 per 4 mm unit sample length in a surface roughness profile obtained according to U.S. standard ASME B46.1-2009. In this case, at least one valley deeper than a −0.5 μm lower criteria line C2 exists between adjacent effective peaks among the effective peaks. When there is no valley deeper than the −0.5 μm lower criteria line C2 between adjacent peaks which rise above the upper criteria line C1, all of the adjacent peaks may not be "effective peaks" used for measuring the PDs, and relatively lower peaks among the peaks are ignored when obtaining the number of "effective peaks."

According to the present invention, a PD of at least one of the first and second surfaces S1 and S2 of the electrolytic copper foil 110, for example, the PD of the first surface S1 ranges from 3 to 110.

When the PD is less than 3, an active specific surface area of the electrolytic copper foil 110 which may come into contact with the negative electrode active material is too small to ensure sufficient adhesion between the electrolytic copper foil 110 and the first active material layer 120a. On the other hand, when the PD is more than 110, coating uniformity of the negative electrode active material is degraded due to too many surface irregularities, and thus adhesion between the electrolytic copper foil 110 and the first active material layer 120a is significantly degraded.

According to an embodiment of the present invention, all of the first and second surfaces S1 and S2 of the electrolytic copper foil 110 may have a PD of 3 to 110, and a difference between the PDs of the first and second surfaces S1 and S2 may be 95 or less. When the difference between the PDs of the first and second surfaces S1 and S2 is more than 95, there is a risk that the capacity retention rate of the secondary battery is degraded due to a difference between structures of the first and second surfaces S1 and S2.

In the present invention, the texture coefficient of the (220) plane of the electrolytic copper foil 110 is measured and calculated as follows.

Figure 3:
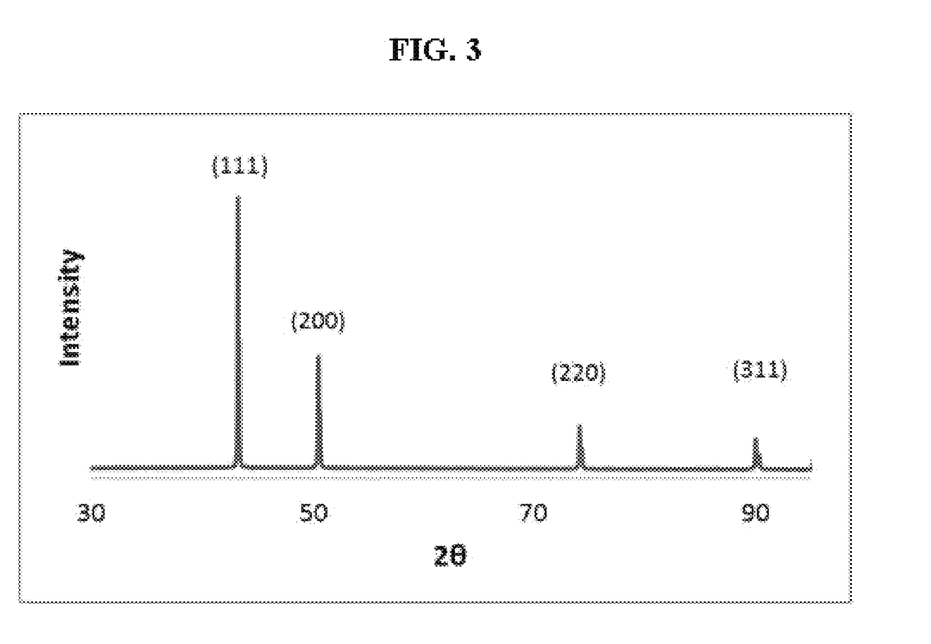
FIG. 3 is an X-ray diffraction (XRD) graph of an electrolytic copper foil.

First, an X-ray diffraction (XRD) graph having peaks corresponding to n crystal planes [e.g., an XRD graph having peaks corresponding to (111), (200), (220), and (311) planes illustrated in FIG. 3] is obtained by performing an XRD [Target: Copper K alpha 1, 2θ interval: 0.01°, and 2θ scan speed 3°/min] with a diffraction angle (2θ) range of 30° to 95°, and an XRD diffraction intensity [I(hkl)] of each of crystal planes (hkl) is obtained from the XRD graph. Also, an XRD diffraction intensity [$I_0$(hkl)] of each of n crystal planes of a standard copper powder specified by Joint Committee on Powder Diffraction Standards (JCPDS) is obtained. Next, an arithmetic mean value of I(hkl)/$I_0$(hkl) of the n crystal planes is obtained, and a texture coefficient [TC(220)] of the (220) plane of the electrolytic copper foil 110 is then calculated by dividing I(220)/$I_0$(220) of the (220) plane by the arithmetic average value. That is, the texture coefficient [TC(220)] of the (220) plane is calculated based on the following Equation 1.

$$TC(220) = \frac{\frac{I(220)}{I_0(220)}}{\frac{1}{n}\sum \frac{I(hkl)}{I_0(hkl)}}$$ [Equation 1]

According to the present invention, the texture coefficient [TC(220)] of the (220) plane of at least one of the first and second surfaces S1 and S2 of the electrolytic copper foil 110, for example, the texture coefficient [TC(220)] of the (220) plane of the first surface S1 is 1.32 or less.

This means that, as the texture coefficient [TC(220)] of the (220) plane is increased, the electrolytic copper foil 110 has a more dense crystal structure. That is, when the texture coefficient [TC(220)] of the (220) plane is more than 1.32, the crystal structure of the electrolytic copper foil 110 is too dense and an active site which may stably come into contact with the negative electrode active material is insufficient. As a result, a sufficient adhesive force may not be secured between the electrolytic copper foil 110 and the negative electrode active material. When the secondary battery is charged and discharged, the electrolytic copper foil 110 does not expand or contract corresponding to the first active material layer 120a, and thus a risk of separating the first active material layer 120a from the electrolytic copper foil 110 is increased.

According to an embodiment of the present invention, all of the first and second surfaces S1 and S2 of the electrolytic copper foil 110 may have the texture coefficient [TC(220)] of the (220) plane of 1.32 or less, and a difference between texture coefficients [TC(220)] of (220) planes of the first and second surfaces S1 and S2 may be 0.53 or less. When the difference between the texture coefficients [TC(220)] of the (220) planes is more than 0.53, there is a risk that the capacity retention rate of the secondary battery is degraded due to a difference between crystal structures of the first and second surfaces S1 and S2.

In the present invention, the surface roughness (Rz) of the electrolytic copper foil 110 is measured according to Japanese Industrial Standards (JIS) B 0601-1994.

According to the present invention, the surface roughness (Rz) of at least one of the first and second surfaces S1 and S2 of the electrolytic copper foil 110, for example, the surface roughness (Rz) of the first surface S1 ranges from 0.5 to 2.7 μm.

When the surface roughness (Rz) is less than 0.5 μm, the active specific surface area of the electrolytic copper foil 110 which may come into contact with the negative electrode active material is too small to ensure sufficient adhesion between the electrolytic copper foil 110 and the first active material layer 120a. On the other hand, when the surface roughness (Rz) is more than 2.7 μm, coating uniformity of the negative electrode active material is degraded due to an excessively uneven surface of the electrolytic copper foil 110, and thus the adhesion between the electrolytic copper foil 110 and the first active material layer 120a is significantly degraded.

According to an embodiment of the present invention, all of the first and second surfaces S1 and S2 of the electrolytic copper foil 110 may have a surface roughness (Rz) of 0.5 to 2.7 μm, and a difference between the surface roughnesses (Rz) of the first and second surfaces S1 and S2 may be 0.8 μm or less. When the difference between the surface roughnesses (Rz) is more than 0.8 μm, there is a risk that the capacity retention rate of the secondary battery is degraded due to a difference between surface structures of the first and second surfaces S1 and S2.

Hereinafter, a method of manufacturing an electrolytic copper foil 110 according to an embodiment of the present invention will be described in detail.

First, the copper layer 111 is formed by applying electricity between a positive electrode plate and a rotating negative electrode drum, which are disposed in an electrolytic solution containing 70 to 90 g/L of copper ions and 50 to 150 g/L of sulfuric acid to be spaced apart from each other. According to an embodiment of the present invention, the copper layer 111 is formed on the rotating negative electrode drum by performing electroplating at a current density of 40 to 80 A/dm$^2$.

According to the present invention, when the copper layer 111 is formed, the electrolytic solution is maintained so that total carbon (TC) in the electrolytic solution is maintained at 0.25 g/L or less. The TC may include total organic carbon (TOC) and total inorganic carbon (TIC) and may be analyzed through a TC measurement facility.

In order to maintain the TC of the electrolytic solution at 0.25 g/L or less, a high-purity copper wire is heat-treated to burn organic matter, the heat-treated copper wire is pickled, and the pickled copper wire is introduced into sulfuric acid to prepare an electrolytic solution having little or no impurities. The copper wire may be heat-treated at a temperature of 600 to 900° C. for 30 to 60 minutes.

Meanwhile, the method of the present invention may further include performing continuous (or circulating) filtration at a flow rate of 31 to 45 m³/hr to remove solid impurities from the electrolytic solution while the electroplating is performed. When the flow rate is less than 31 m³/hr, a flow velocity is lowered, overvoltage is increased, and the copper layer 111 is not uniformly formed. On the other hand, when the flow rate is more than 45 m³/hr, a filter is damaged and foreign matter is introduced into the electrolytic solution.

Optionally, the TC may be lowered by decomposing organic matter in the electrolytic solution through an ozone treatment.

Optionally, cleanliness of the electrolytic solution may be improved by introducing hydrogen peroxide and air into the electrolytic solution while the electroplating is performed.

According to an embodiment of the present invention, a concentration of silver (Ag) in the electrolytic solution is maintained at 0.2 g/L or less when the copper layer 111 is formed (i.e., when the electroplating is performed). In order to prevent the concentration of silver (Ag) from exceeding 0.2 g/L by silver (Ag) being introduced into the electrolytic solution when the electroplating is performed, the electrolytic solution may contain a small amount of chloride ions ($Cl^-$) capable of precipitating silver (Ag) in the form of AgCl. For example, the electrolytic solution may contain 15 to 25 ppm of chloride ions ($Cl^-$).

The PD and the surface roughness (Rz) of the first surface S1 of the electrolytic copper foil 110 may be respectively controlled to be 3 to 110 and 0.5 to 2.7 µm by managing each of the TC and the concentration of silver (Ag) in the above ranges and applying a current density of 40 to 80 A/dm².

Also, a concentration of iron (Fe) in the electrolytic solution should be maintained to be 0.54 g/L or less so that the electrolytic copper foil 110 has the texture coefficient [TC(220)] of the (220) plane of 1.32 or less. Therefore, according to the present invention, the concentration of iron (Fe) in the electrolytic solution is continuously monitored while the electroplating is performed. When the concentration of iron (Fe) is more than 0.54 g/L, all or some (e.g., 10 to 20 wt %) of the electrolytic solution is replaced by a new electrolytic solution.

Optionally, the electrolytic solution may further include an organic additive selected from the group consisting of hydroxyethyl cellulose (HEC), organic sulfides, organic nitrides, and thiourea-based compounds.

Also, the electrolytic solution may further include 1 to 10 ppm of ethylene thiourea. More specifically, the electrolytic solution may further include 1 to 5 ppm of ethylene thiourea.

Next, the first and second protective layers 112a and 112b are formed on the copper layer 111 by immersing the copper layer 111 manufactured as described above in an antirust solution containing 0.5 to 1.5 g/L of Cr (e.g., at room temperature for 2 to 20 seconds) and drying the copper layer 111.

The antirust solution may further include at least one of a silane compound and a nitrogen compound. For example, the antirust solution may include 0.5 to 1.5 g/L of Cr and 0.5 to 1.5 g/L of a silane compound.

Meanwhile, the PD and the surface roughness (Rz) of the second surface S2 of the electrolytic copper foil 110 may be controlled to be 3 to 110 and 0.5 to 2.7 µm, respectively, by adjusting a degree of polishing of a surface (e.g., a surface on which copper is precipitated by performing electroplating) of the rotating negative electrode drum.

According to an embodiment of the present invention, the surface of the rotating negative electrode drum is polished with an abrasive brush having a particle-size (Grit) of #800 to #1500.

The secondary battery electrode (i.e., an anode) of the present invention may be manufactured by coating the electrolytic copper foil 110 of the present invention manufactured as described above with the negative electrode active material.

The negative electrode active material may be selected from the group consisting of carbon, a metal such as Si, Ge, Sn, Li, Zn, Mg, Cd, Ce, Ni, or Fe, an alloy containing the metal, an oxide of the metal, and a complex of the metal and carbon.

For example, 1 to 3 parts by weight of styrene butadiene rubber (SBR) and 1 to 3 parts by weight of carboxymethyl cellulose (CMC) are mixed in 100 parts by weight of carbon for the negative electrode active material, and a slurry is then prepared using distilled water as a solvent. Next, the electrolytic copper foil 110 is coated with the slurry to have a thickness of 20 to 100 µm using a doctor blade and is pressed at a temperature of 110 to 130° C. under a pressure of 0.5 to 1.5 ton/cm².

The lithium secondary battery may be manufactured using a conventional cathode, an electrolyte, and a separator together with the secondary battery electrode (or the anode) of the present invention manufactured as described above.

Hereinafter, the present invention will be described in detail with reference to examples and comparative examples. However, the following examples are only examples to help understanding of the present invention, and the scope of the present invention is not limited to these examples.

Examples 1 to 4 and Comparative Examples 1 to 9

A copper layer was formed by applying electricity between a positive electrode plate and a rotating negative electrode drum, which were disposed in an electrolytic solution to be spaced apart from each other. The electrolytic solution contained 75 g/L of copper ions, 100 g/L of sulfuric acid, 8 ppm of bis-(3-sulfopropyl)-disulfide (SPS), 20 ppm of chloride ions ($Cl^-$), and 2 ppm of ethylene thiourea, and was maintained at a temperature of 55° C. While electroplating was performed, continuous filtration for removing solid impurities from the electrolytic solution was performed at a flow rate of 37 m³/hr. A current density applied for electroplating, TC in the electrolytic solution, a concentration of Ag in the electrolytic solution, and a concentration of Fe in the electrolytic solution are illustrated in Table 1. The copper layer formed by the electroplating being performed was immersed in an antirust solution and then dried to prepare the electrolytic copper foil.

TABLE 1

|  | Current Density (A/dm$^2$) | Total Carbon (TC) in Electrolytic Solution (g/L) | Concentration of Ag in Electrolytic Solution (g/L) | Concentration of Fe in Electrolytic Solution (g/L) |
| --- | --- | --- | --- | --- |
| Example 1 | 42 | 0.04 | 0.03 | 0.08 |
| Example 2 | 78 | 0.04 | 0.19 | 0.08 |
| Example 3 | 60 | 0.24 | 0.19 | 0.08 |
| Example 4 | 60 | 0.06 | 0.19 | 0.51 |
| Comparative Example 1 | 85 | 0.04 | 0.19 | 0.24 |
| Comparative Example 2 | 35 | 0.04 | 0.03 | 0.08 |
| Comparative Example 3 | 60 | 0.29 | 0.18 | 0.07 |
| Comparative Example 4 | 60 | 0.05 | 0.22 | 0.24 |
| Comparative Example 5 | 60 | 0.04 | 0.18 | 0.57 |
| Comparative Example 6 | 60 | 0.28 | 0.22 | 0.27 |
| Comparative Example 7 | 25 | 0.28 | 0.11 | 0.27 |
| Comparative Example 8 | 25 | 0.08 | 0.11 | 0.58 |
| Comparative Example 9 | 25 | 0.28 | 0.25 | 0.58 |

A PD, a texture coefficient of a (220) plane, and a surface roughness (Rz) of each of first surfaces (e.g., surfaces of electrolytic copper foils facing matte surfaces of copper layers) and each of second surfaces opposite the first surfaces of electrolytic copper foils in Examples 1 to 4 and Comparative Examples 1 to 9 manufactured as described above were obtained, adhesions between the surfaces and active material layers were obtained, capacity retention rates of secondary batteries including anodes made of the electrolytic copper foils in Examples 1 to 4 and Comparative Examples 1 to 9 were obtained, and results thereof were illustrated in Table 2.

PD (Peak Density; Ea)

The PDs of the first and second surfaces of the electrolytic copper foils were measured using a Mahrsurf M300 illuminometer manufactured by Mahr.

As described above, the PD is an average value of PDs of any three points, and the PD of each of the points is the number of effective peaks which rise above a 0.5 µm upper criteria line per 4 mm unit sample length in a surface roughness profile obtained according to U.S. standard ASME B46.1-2009. When there is no valley deeper than a −0.5 µm lower criteria line between adjacent peaks which rise above the upper criteria line, relatively lower peak(s) among the peaks were ignored when obtaining the number of "effective peaks."

Texture Coefficient [TC(220)] of (220) Plane

An XRD graph having peaks corresponding to n crystal planes was obtained by performing XRD [(i) Target: Copper K alpha 1, (ii) 2θ interval: 0.010, and (iii) 2θ scan speed: 3°/min] with a diffraction angle (2θ) range of 30° to 95°, and an XRD diffraction intensity [I(hkl)] of each of crystal planes (hkl) was obtained from the XRD graph. Also, an XRD diffraction intensity [I$_0$(hkl)] of each of the n crystal planes of a standard copper powder specified by JCPDS was obtained. Next, an arithmetic mean value of I(hkl)/I$_0$(hkl) of the n crystal planes was obtained, and the texture coefficient [TC(220)] of the (220) plane of the electrolytic copper foil 110 was then calculated by dividing I(220)/I$_0$(220) of the (220) plane by the arithmetic average value. That is, the texture coefficient [TC(220)] of the (220) plane was calculated based on the following Equation 1.

$$TC(220) = \frac{\frac{I(220)}{I_0(220)}}{\frac{1}{n}\sum \frac{I(hkl)}{I_0(hkl)}} \quad \text{[Equation 1]}$$

Surface Roughness (Rz) (µm)

The surface roughnesses (Rz) of the first and second surfaces of the electrolytic copper foils [a measured length 4 mm (excluding cut off section)] were measured using a Mahrsurf M300 illuminometer manufactured by Mahr according to JIS B 0601-1994.

Capacity Retention Rate (%) of Secondary Battery

First, anodes were prepared with the electrolytic copper foils in Examples 1 to 4 and Comparative Examples 1 to 9. Specifically, 2 parts by weight of SBR and 2 parts by weight of CMC were mixed in 100 parts by weight of carbon commercially available as a negative electrode active material. Next, a slurry was prepared by adding distilled water serving as a solvent to the mixture. The surface of the electrolytic copper foil was coated with the slurry to have a thickness of about 80 µm using a doctor blade and dried at a temperature of 120° C., and the anodes were then prepared by a roll pressing process being performed thereon.

Lithium manganese oxide ($Li_{1.1}Mn_{1.85}Al_{0.05}O_4$) and lithium manganese oxide (o-LiMnO$_2$) having an orthorhombic crystal structure were mixed at a weight ratio of 90:10 to prepare a positive electrode active material. The positive electrode active material, carbon black, and polyvinylidene fluoride (PVDF) were mixed with N-methyl-2-pyrrolidone (NMP) as an organic solvent at a weight ratio of 85:10:5 to prepare a slurry. Both surfaces of an aluminum foil having a thickness of 20 µm were coated with the slurry and dried to prepare a cathode.

Also, a basic electrolytic solution was obtained by dissolving 1 M of LiPF$_6$ as a solute in a non-aqueous organic solvent in which ethylene carbonate (EC) and ethyl methyl carbonate (EMC) were mixed at a weight ratio of 1:2. An electrolytic solution for a secondary battery was prepared by mixing 99.5 wt % of the basic electrolytic solution and 0.5 wt % of succinic anhydride.

A secondary battery was prepared using the anode, the cathode, and the electrolytic solution, which were prepared as described above.

Next, with respect to the secondary battery manufactured as described above, a capacity per g of a cathode was measured with a charge operating voltage of 4.3 V and a discharge operating voltage of 3.4 V, a charging and discharging experiment was performed 500 times at a temperature of 50° C. at a charge and discharge rate of 0.5 C in order to evaluate a high-temperature lifetime, and a capacity retention rate of the secondary battery was calculated according to the following Equation 2 (for reference, a capacity retention rate of the secondary battery required in the industry is 80% or more).

Capacity retention rate (%)=(500th discharge capacity/first discharge capacity)×100   [Equation 2]

TABLE 2

|  | PD (ea) | | | TC (220) | | | Rz (μm) | | | Capacity |
| --- | --- | --- | --- | --- | --- | --- | --- | --- | --- | --- |
|  | First Surface | Second Surface | Difference | First Surface | Second Surface | Difference | First Surface | Second Surface | Difference | Retention Rate (%) |
| Example 1 | 4 | 17 | 13 | 0.53 | 0.73 | 0.20 | 1.13 | 1.58 | 0.45 | 89 |
| Example 2 | 105 | 18 | 87 | 0.48 | 0.79 | 0.31 | 0.65 | 1.40 | 0.75 | 92 |
| Example 3 | 107 | 15 | 92 | 0.52 | 0.79 | 0.27 | 2.52 | 1.88 | 0.64 | 85 |
| Example 4 | 108 | 15 | 93 | 1.25 | 0.83 | 0.42 | 0.53 | 1.32 | 0.79 | 83 |
| Comparative Example 1 | 115 | 23 | 92 | 0.89 | 0.79 | 0.10 | 1.53 | 1.87 | 0.34 | 75 |
| Comparative Example 2 | 2 | 15 | 13 | 0.97 | 0.79 | 0.18 | 1.18 | 1.42 | 0.24 | 69 |
| Comparative Example 3 | 102 | 21 | 81 | 0.97 | 0.79 | 0.18 | 2.79 | 1.76 | 1.03 | 69 |
| Comparative Example 4 | 115 | 23 | 92 | 0.88 | 0.82 | 0.06 | 0.63 | 1.46 | 0.83 | 72 |
| Comparative Example 5 | 103 | 22 | 81 | 1.35 | 0.83 | 0.52 | 0.67 | 1.42 | 0.75 | 78 |
| Comparative Example 6 | 117 | 19 | 98 | 0.88 | 0.82 | 0.06 | 2.49 | 1.83 | 0.66 | 75 |
| Comparative Example 7 | 57 | 17 | 40 | 0.88 | 0.79 | 0.09 | 2.81 | 1.79 | 0.84 | 73 |
| Comparative Example 8 | 57 | 22 | 35 | 1.33 | 0.77 | 0.54 | 2.13 | 1.79 | 0.34 | 78 |
| Comparative Example 9 | 117 | 21 | 96 | 1.31 | 0.75 | 0.56 | 2.67 | 1.63 | 1.04 | 63 |

Referring to the above Table 2, it may be seen that the capacity retention rate of the secondary battery manufactured using the following electrolytic copper foils does not satisfy 80% or more required in the industry.

(1) Electrolytic copper foils (in Comparative Examples 1, 4, 6, and 9) of which a PD of a first surface is more than 110 or an electrolytic copper foil (in Comparative Example 2) of which a PD of a first surface is less than 3.

(2) Electrolytic copper foils (in Comparative Examples 6 and 9) of which a difference between PDs of first and second surfaces is more than 95.

(3) Electrolytic copper foils (in Comparative Examples 5 and 8) of which a texture coefficient [TC(220)] of the (220) plane of a first surface is more than 1.32.

(4) Electrolytic copper foils (in Comparative Examples 8 and 9) of which a difference between texture coefficients [TC(220)] of the (220) planes of first and second surfaces is more than 0.53.

(5) Electrolytic copper foils (in Comparative Examples 3 and 7) of which a surface roughness (Rz) of a first surface is more than 2.7 μm.

(6) Electrolytic copper foils (in Comparative Examples 3, 4, 7, and 9) of which a difference between surface roughnesses (Rz) of first and second surfaces is more than 0.8 μm.

Figure 4A:
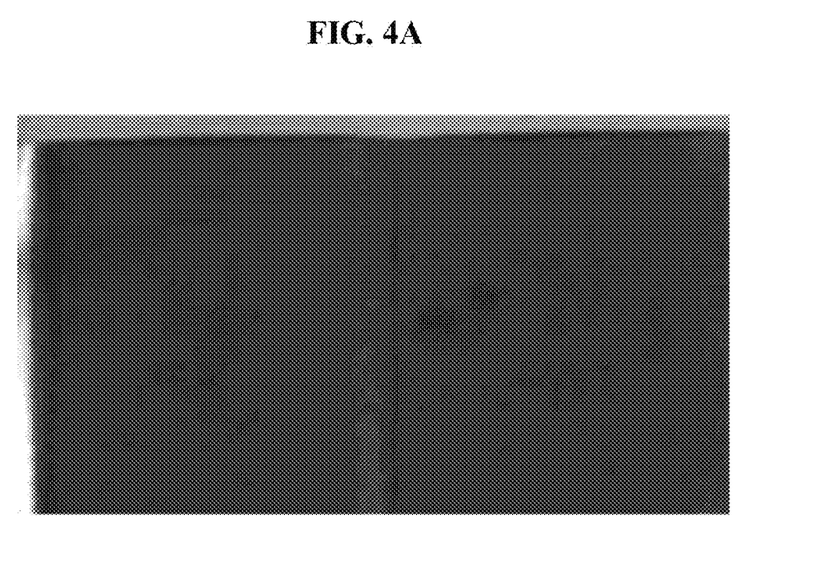
FIGS. 4A and 4B are photographs illustrating states of anodes after a charging and discharging test of secondary batteries manufactured using electrolytic copper foils of Example 2 and Comparative Example 2.
Figure 4B:
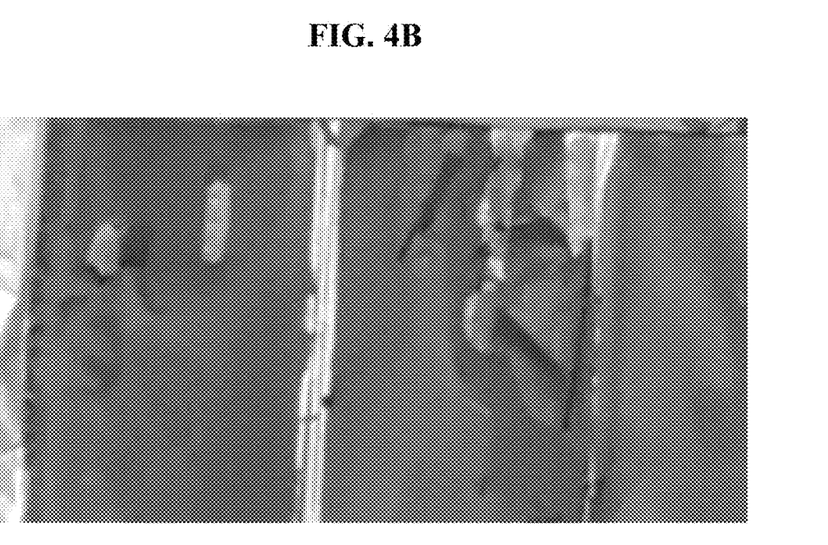

FIGS. 4A and 4B are photographs illustrating states of anodes after charging and discharging tests of secondary batteries manufactured using the electrolytic copper foils of Example 2 and Comparative Example 2.

As illustrated in FIG. 4A, in the anode manufactured by the electrolytic copper foil of Example 2, the copper layer and the active material layer were firmly adhered even after 500 charging and discharging tests. On the other hand, as illustrated in FIG. 4B, in the anode manufactured by the electrolytic copper foil in Comparative Example 2, it may be seen that a significant area of a portion of the active material layer was separated from the copper layer after 500 charging and discharging tests.

According to the present invention, despite repetition of a charging and discharging cycle, a long-life secondary battery capable of maintaining a high charge and discharge capacity for a long time can be manufactured. Therefore, inconvenience of consumers of electronic products and resource waste due to the frequent replacement of secondary batteries can be minimized.

What is claimed is:

1. A method of manufacturing a secondary battery electrolytic copper foil, the method comprising:
    forming a copper layer by applying electricity between a positive electrode plate and a rotating negative electrode drum which are disposed in an electrolytic solution containing 70 to 90 g/L of copper ions and 50 to 150 g/L of sulfuric acid to be spaced apart from each other; and
    forming a protective layer on the copper layer,
    wherein the forming of the copper layer includes:
    performing a heat treatment on a copper wire;
    pickling the heat-treated copper wire;
    preparing the electrolytic solution by introducing the pickled copper wire into sulfuric acid;
    performing electroplating by applying electricity between the positive electrode plate and the rotating negative electrode drum at a current density of 40 to 80 A/dm$^2$; and
    performing continuous filtration at a flow rate of 31 to 45 m$^3$/hr to remove solid impurities from the electrolytic solution while the electroplating is performed,
    wherein, while the electroplating is performed, total carbon (TC) in the electrolytic solution is maintained at a range of 0.04 to 0.24 g/L, a concentration of silver (Ag) therein is maintained at a range of 0.03 to 0.19 g/L, and a concentration of iron (Fe) therein is maintained at a range of 0.05 to 0.51 g/L.

2. The method of claim 1, further comprising:
    monitoring the concentration of iron (Fe) in the electrolytic solution while the electroplating is performed; and
    replacing all or some of the electrolytic solution when the concentration of iron (Fe) is more than 0.54 g/L.

3. The method of claim 1, wherein the copper wire is heat-treated at a temperature of 600 to 900° C. for 30 to 60 minutes.

4. The method of claim 1, wherein the electrolytic solution further includes chloride ion capable of precipitating silver (Ag) in the form of AgCl in order to prevent the concentration of silver (Ag) from exceeding 0.2 g/L by silver (Ag) being introduced into the electrolytic solution while the electroplating is performed.

5. The method of claim 1, wherein the forming of the copper layer further includes introducing hydrogen peroxide and air into the electrolytic solution while the electroplating is performed.

6. The method of claim 1, wherein the electrolytic solution further includes an organic additive selected from a group consisting of hydroxyethyl cellulose (HEC), organic sulfides, organic nitrides, and thiourea-based compounds.

7. The method of claim 1, wherein the electrolytic solution further includes 1 to 10 ppm of ethylene thiourea.

8. The method of claim 1, wherein the forming of the copper layer includes polishing a surface of the rotating negative electrode drum with an abrasive brush having #800 to #1500 of a particle-size (Grit).

9. The method of claim 1, wherein:
the forming of the protective layer includes immersing the copper layer in an antirust solution containing 0.5 to 1.5 g/L of Cr; and
a concentration of copper (Cu) in the antirust solution is maintained at 0.1 g/L or less.

10. A secondary battery electrolytic copper foil, which is manufactured by the method of claim 1, and includes a first surface and a second surface opposite the first surface, the electrolytic copper foil comprising:
a copper layer including a matte surface facing the first surface and a shiny surface facing the second surface; and
a first protective layer on the matte surface of the copper layer,
wherein the first surface has a peak density (PD) of 3 to 110, a texture coefficient [TC(220)] of a (220) plane of 1.32 or less, and a surface roughness ($R_z$)) of 0.5 to 2.7 μm.

11. The electrolytic copper foil of claim 10, further comprising a second protective layer on the shiny surface of the copper layer,
wherein the second surface has a PD of 3 to 110, a texture coefficient [TC(220)] of a (220) plane of 1.32 or less, and a surface roughness ($R_z$)) of 0.5 to 2.7 μm.

12. The electrolytic copper foil of claim 11, wherein:
a difference between the PDs of the first and second surfaces is 95 or less;
a difference between the texture coefficients [TC(220)] of the (220) planes of the first and second surfaces is 0.53 or less; and,
a difference between the surface roughnesses ($R_z$) of the first and second surfaces is 0.8 μm or less.

13. The electrolytic copper foil of claim 12, wherein each of the first and second protective layers includes chromium (Cr).

14. The electrolytic copper foil of claim 10, wherein the electrolytic copper foil has a yield strength of 21 to 63 kgf/mm$^2$ and an elongation of 3% or more at room temperature.

15. A secondary battery electrode comprising:
an electrolytic copper foil being manufactured by the method of claim 1, and including a first surface and a second surface opposite the first surface; and
a first active material layer on the first surface of the electrolytic copper foil,
wherein the electrolytic copper foil includes:
a copper layer including a matte surface facing the first surface and a shiny surface facing the second surface; and
a first protective layer on the matte surface of the copper layer, and
wherein the first surface has a PD of 3 to 110, a texture coefficient [TC(220)] of a (220) plane of 1.32 or less, and a surface roughness ($R_z$) of 0.5 to 2.7 μm.

16. The secondary battery electrode of claim 15, wherein:
the electrolytic copper foil further includes a second protective layer on the shiny surface of the copper layer;
the secondary battery electrode further includes a second active material layer on the second protective layer; and
the second surface has a PD of 3 to 110, a texture coefficient [TC(220)] of a (220) plane of 1.32 or less, and a surface roughness ($R_z$) of 0.5 to 2.7 μm.

17. The secondary battery electrode of claim 16, wherein:
a difference between the PDs of the first and second surfaces is 95 or less;
a difference between the texture coefficients [TC(220)] of the (220) planes of the first and second surfaces is 0.53 or less; and
a difference between the surface roughnesses ($R_z$) of the first and second surfaces is 0.8 μm or less.

18. The secondary battery electrode of claim 16, wherein each of the first and second active material layers comprises at least one active material selected from a group consisting of carbon, a metal such as Si, Ge, Sn, Li, Zn, Mg, Cd, Ce, Ni, or Fe, an alloy containing the metal, an oxide of the metal, and a composite of the metal and carbon.

19. The secondary battery electrode of claim 18, wherein each of the first and second active material layers comprises Si.

20. A secondary battery comprising:
a cathode;
an anode opposite to the cathode and including a secondary battery electrode;
an electrolyte configured to provide an environment in which lithium ions may move between the cathode and the anode; and
a separator configured to electrically insulate the cathode from the anode,
wherein the secondary battery electrode is manufactured by the method of claim 1, and comprises:
an electrolytic copper foil including a first surface and a second surface opposite the first surface; and
a first active material layer on the first surface of the electrolytic copper foil,
wherein the electrolytic copper foil includes:
a copper layer including a matte surface facing the first surface and a shiny surface facing the second surface; and
a first protective layer on the matte surface of the copper layer, and
wherein the first surface has a PD of 3 to 110, a texture coefficient [TC(220)] of a (220) plane of 1.32 or less, and a surface roughness ($R_z$) of 0.5 to 2.7 μm.

* * * * *